United States Patent [19]

Abatemarco

[11] 4,022,071
[45] May 10, 1977

[54] STEEL CORD BELT REINFORCED TRANSMISSION BELT

[76] Inventor: Michael R. Abatemarco, 53 Parker Ave., New City, Rockland County, N.Y. 10956

[22] Filed: Jan. 22, 1976

[21] Appl. No.: 651,401

[52] U.S. Cl. .................................. 74/237; 74/234
[51] Int. Cl.² .................... F16G 1/22; F16G 5/10
[58] Field of Search .............. 74/237, 234, 231 R

[56] References Cited

UNITED STATES PATENTS

| 420,779 | 2/1890 | Emery | 74/237 |
| 2,538,414 | 1/1951 | Crosby | 74/237 X |
| 3,523,462 | 8/1970 | Beindorf | 74/237 X |
| 3,621,727 | 11/1971 | Cicognani | 74/237 X |
| 3,664,490 | 5/1972 | Maruyama | 74/237 X |
| 3,853,017 | 12/1974 | White, Jr. | 74/234 |
| 3,897,291 | 7/1975 | Hoback et al. | 74/237 X |

Primary Examiner—Leonard H. Gerin
Attorney, Agent, or Firm—George H. Mitchell, Jr.

[57] ABSTRACT

A V-belt for transmitting power has one or more flexible internal steel cord belts incorporated therein together with conventional textile reinforcing means. The steel cord belt reinforcement is in a plane parallel to the inner and outer parallel faces of the V-belt. The provision of the steel cord belt reinforcement minimizes belt cracking and materially increases belt tensile strength and stability without substantially lessening flexibility of the V-belt.

5 Claims, 11 Drawing Figures

STEEL CORD BELT REINFORCED TRANSMISSION BELT

BACKGROUND OF THE INVENTION

There is an ever-increasing need for stronger and more durable power transmission belts including notably V-belts to satisfy the complex needs of industry. The range of application of V-belts for transmitting power is constantly expanding between the extremes of very small radius drives to heavy power transmission applications.

To meet these expanding needs, it has been proposed in the prior art to strengthen V-belts and other transmission belts by incorporating therein various arrangements of textile reinforcements and, in some cases, metal cable reinforcements including twisted strand steel cables. These efforts to strengthen transmission belts have been in conjunction with the use of improved elastomers having high tensile strength characteristics and resistance to fretting, cracking and corrosion.

Notwithstanding these efforts, the need and demand for improved flexible transmission belts persists in the art, and it is therefore the objective of this invention to satisfy this need to a substantial extent through the provision of a steel cord belt reinforced power transmission belt of increased flexibility, stability, tensile strength, resistance to twisting or kinking, and also resistance to cracking. In accordance with the invention, all of these improved characteristics are provided in an economic manner and in an entirely practical manner by utilizing a highly flexible and high strength steel cord belt reinforcement in one or more layers internally within the transmission belt, with such layer or layers parallel to the inner and outer parallel surfaces of the transmission belt. The formation and bonding of the steel cord belt reinforcement is accomplished by known techniques currently in wide usage by tire manufacturers in connection with the very popular steel cord belted automotive tires now on the market.

Some examples of the patented prior art which fall short of accomplishing the objectives of this invention but which are of interest in showing the field of the invention are U.S. Pat. Nos. 3,221,869, Paasche; 3,479,892 Cicognani; and 3,736,805, Dent.

Another vital factor in satisfactory V-belt service is freedom from the necessity for frequent adjustment of belt tension caused by stretching. The invention also satisfies this need of the art by providing a belt having a nearly zero stretch factor. This is made possible by employing high-tensile steel strands or cords in a thin single layer woven screen-like internal steel belt, to be fully described. Such a belt has practically zero stretch and great resistance to shock loading and requires practically no tension adjustment after installation. By employing several steel cord belts at strategic zones of the V-belt, the overall belt strength can be made exceptional, to meet the needs of heavier loads at higher speeds for longer periods of time in comparison to conventional belts, thus greatly increasing the safety factor.

In applications which require more than one V-belt for transmitting the load, the use of the invention can significantly reduce the number of belts required without loss of strength in the drive.

By means of the invention, V-belt tension in a particular application can be made more uniform, with the result of much longer belt life. The ideal tension is that which will assure no belt slippage under optimum loading. If the tension is too high, the life on the belt will decrease and bearing and other machine stresses will be excessive. If belt tension is too low, the belt will slip with resulting power loss and increased wear on the belt and associated sheaves.

As stated, the invention allows belt tension for a given belt size and power transmitting application to be held much more uniform or constant than in the prior art.

Other features and advantages of the invention will become apparent during the course of the following description.

DETAILED DESCRIPTION

Figure 1:
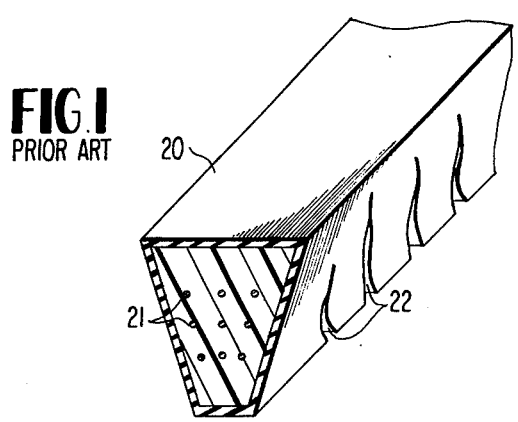
FIG. 1 is a fragmentary perspective view of a V-belt for transmitting power according to the conventional prior art.

Referring to the drawings in detail wherein like numerals designate like parts throughout, attention is directed first to FIG. 1 illustrating a V-belt for transmitting power in a mechanical drive constructed according to the teachings of the prior art. In FIG. 1, conventionally a V-belt body 20 is molded from high strength durable elastomer in accordance with known techniques and the latest available material. The physical characteristics of the elastomer body 20 may be regulated as to hardness, relative flexibility and tensile strength according to the needs dictated by transmission belt application. Additionally, the prior art belt may have plural layer internal reinforcement by means of cords or filaments 21 formed of textiles including nylon, polyester or rayon. In some instances, the prior art transmission belt may be reinforced internally by twisted strand steel cabling, usually a single steel cable near the cross sectional center of the belt.

While all of these prior art means improve the strength and durability of transmission belts, they do not eliminate the formation and propagation of cracks 22 which develop at the internal face of the belt and spread radially outwardly as the belt continues to transmit power by passing around flanged pulleys of whatever size the particular belt is designed to engage. Among the difficulties of the prior art, in addition to cracking, are lack of flexibility where too much textile reinforcement is employed or where a steel twisted strand cable is employed. Such reinforced belts will tend to overheat, stretch and eventually slip and wear and finally fail by delaminating. Frequently, the prior art designs drastically limit the applicability of V-belts on small pulley drives due to the inability of the belt to bend abruptly.

According to the present invention, the above and other known problems of the prior art are to a great extent eliminated, and the improved belt made according to the invention is not only stronger and capable of transmitting more power for a given cross sectional size, but is also more flexible and more stretch-resistant.

Figure 2:
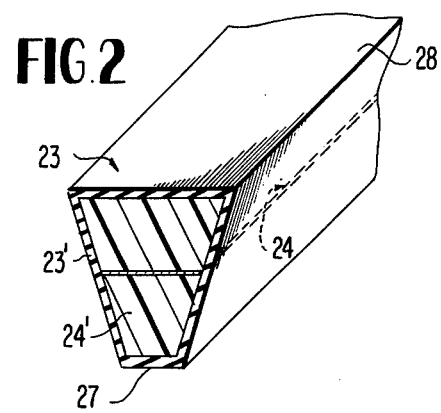
FIG. 2 is a similar view of a steel cord belt reinforced transmission belt according to the present invention.

More particularly, the invention embodies a V-belt 23, FIG. 2, having the usual outer layer or cover 23' and having a belt body 24' formed of modern high strength crack-resistant elastomer, such material being available on the market. The relative hardness or softness of the elastomer, its flexibility and tensile strength are selected to best meet the needs of particular power transmission applications. In all cases, the V-belt elastomer body 24' is reinforced internally by at least one highly flexible and stretch-resistant steel cord belt reinforcement 24, FIG. 2, similar to the kind employed in modern steel cord belted automobile tires.

Figure 10:
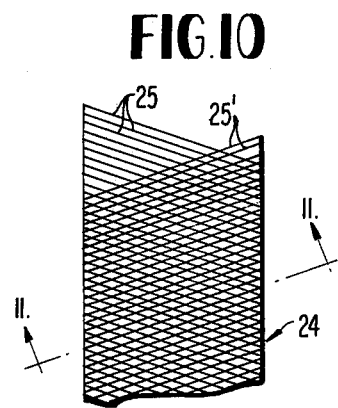
FIG. 10 is a fragmentary plan view of a steel cord belt reinforcement apart from the transmission belt.
Figure 11:
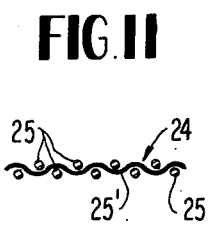
FIG. 11 is an enlarged transverse vertical section taken on line 11—11 of FIG. 10.

Referring to FIGS. 10 and 11, each steel cord belt reinforcement or layer 24 is woven like a wire window screen from biased crossing or intersecting high tensile strength steel strands 25 and 25', the two sets of strands being intertwined or interwoven as depicted in cross section, FIG. 11. The resulting woven steel cord belt 24 is encased in the elastomeric body 24' of the V-belt and permanently bonded therein by techniques well known in the art. The formation of the steel belt reinforcement as shown in FIGS. 10 and 11 renders the same highly resistant to stretching as well as very flexible. The arrangement of the individual steel strands or elements 25 and 25' on the bias, FIG. 10, is highly preferable to any other arrangement such as a right angular arrangement. When properly placed within the V-belt body 24', the steel belt reinforcement 24 is parallel to the inner and outer parallel faces 27 and 28 of the belt and extends from side-to-side of the elastomer body portion 24'.

Figure 4:
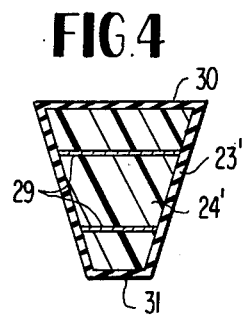
FIGS. 4 through 9 are cross sectional views taken through V-belts embodying the invention and showing variations in the placement or location of steel cord belt reinforcements.
Figure 5:
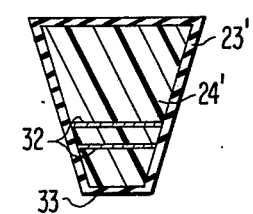
Figure 6:
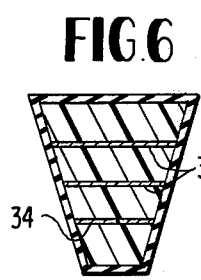
Figure 7:
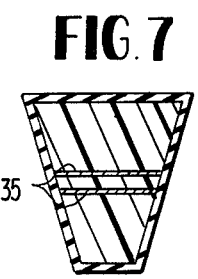
Figure 8:
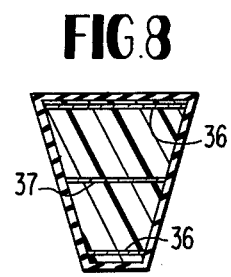
Figure 9:
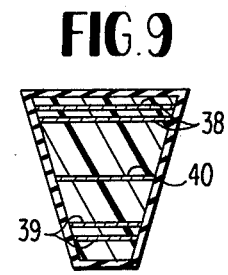

FIG. 2 illustrates the placement of the steel cord belt reinforcement 24 containing interwoven strands 25 and 25' at or near the radial center of thickness of the V-belt and extending continuously throughout its length and from side-to-side thereof. FIGS. 4 through 9 show a number of possible variations in the location of the flexible steel cord belt reinforcements in V-belts, the number of such variations being almost unlimited. FIG. 4 shows a pair of steel cord belt reinforcements 29 disposed relatively near and parallel to the top and bottom belt faces 30 and 31. FIG. 5 shows two reinforcing steel cord belts 32 in closely spaced relation relatively near the inner face 33 of the V-belt. FIG. 6 shows three equidistantly spaced steel cord belts 34. FIG. 7 shows a pair of closely spaced steel cord belts 35 near the radial center of the transmission belt. FIG. 8 shows steel cord belts 36 close to the inner and outer faces of the V-belt plus an intermediate central steel cord belt reinforcement 37 near the center of the transmission belt. FIG. 9 shows plural steel belts 38 and 39 near the inner and outer faces of a transmission belt plus a center steel belt 40 substantially midway between the belts 38.

With any of these arrangements, a very high degree of belt flexibility is achieved along with a great increase in tensile strength or power transmitting ability. Also, the transmission belt is rendered very stable, resistant to twisting or kinking and with the ability to run true or in a straight path defined by its longitudinal edges without serpentine movement. All of these factors are very important in transmission belts. Also the invention minimizes internal heat build-up at high speeds and when the belt is bent abruptly. Small diameter pulley drives are greatly facilitated by the invention including drives which heretofore could not be achieved by means of the prior art.

Figure 3:
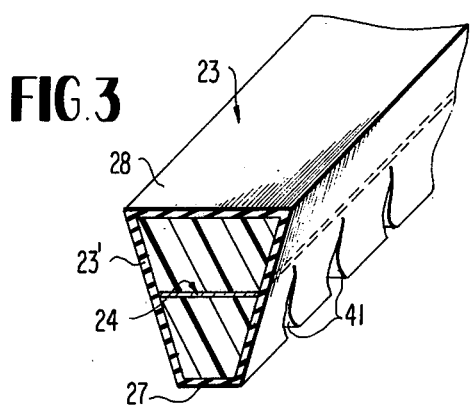
FIG. 3 is a further fragmentary perspective view of the invention as depicted in FIG. 2 and illustrating how crack propagation is arrested by the steel cord belt reinforcement.

FIG. 3 illustrates how the steel cord belt reinforcement 24 near the center of the transmission belt arrests the migration of cracks 41 outwardly or away from the interior face 27. Such cracks are unable to develop further outwardly upon encountering the reinforcement 24.

While the invention has been described particularly in relation to a V transmission belt, it should be understood that it is applicable to transmission belts of other cross sectional forms and to certain types of conveyor belts. On conveyor belts, the placement of a steel cord belt reinforcement close to the top layer of the conveyor belt will reduce cracking at such layer or penetration by sharp objects and will also resist tearing. In the case of V-belts, FIGS. 8 and 9, the upper reinforcements 36 and 38 will resist checking or cracking and will also resist penetration by an object.

The advantages of the invention should now be apparent to those skilled in the art without the need for further description. It should be mentioned that the invention may be employed along with conventional textile belt reinforcing means and may result in lessening the need for such conventional reinforcements.

It is also believed that the invention may allow V-belts to be substituted for toothed belts in certain small radius drives where only toothed belts may now be used.

It is to be understood that the form of the invention herewith shown and described is to be taken as a preferred example of the same, and that various changes in the shape, size and arrangements of parts may be resorted to, without departing from the spirit of the invention or scope of the subjoined claims.

I claim:

1. A power transmission belt comprising a belt body formed of elastomer and having inner and outer parallel faces, and at least one flexible steel cord belt reinforcement for said transmission belt bonded integrally therewith and extending from side-to-side thereof and continuously longitudinally of the transmission belt, said steel cord belt comprising a relatively thin assemblage composed of two adjacent layers of flexible steel wires, each layer of wires being arranged in closely spaced side-by-side relationship and on an opposite bias relative to the longitudinal axis of the transmission belt, the plane of said reinforcement being parallel to said inner and outer faces.

2. A power transmission belt according to claim 1, wherein said elastomer belt body comprises a V-belt body and said flexible steel cord belt reinforcement is arranged internally of said transmission belt and between said inner and outer parallel faces.

3. A power transmission belt according to claim 1, wherein said flexible steel cord belt is a thin sngle layer belt of interwoven steel wire strands.

4. A power transmission belt according to claim 3, and said flexible steel cord belt comprising a thin highly flexible single layer belt near the radial center of said elastomer belt body.

5. A power transmission belt according to claim 4, and certain of said steel cord belts disposed relatively near the inner and outer circumferential surfaces of the belt and other steel cord belts disposed relatively near the radial center of the belt body.

* * * * *